US012593814B2

(12) United States Patent (10) Patent No.: US 12,593,814 B2
Orlowicz et al. (45) Date of Patent: Apr. 7, 2026

(54) ANIMAL LITTER MADE FROM RENEWABLE RESOURCES WITH PERFORMANCE BETTER THAN BENTONITE CLAY

(71) Applicant: The Clorox Company, Oakland, CA (US)

(72) Inventors: Jacob L. Orlowicz, Pleasanton, CA (US); Ahmed Drief, Pleasanton, CA (US); Jeremy A. Thuerk, Pleasanton, CA (US)

(73) Assignee: THE CLOROX COMPANY, Oakland, CA (US)

( * ) Notice: Subject to any disclaimer, the term of this patent is extended or adjusted under 35 U.S.C. 154(b) by 895 days.

(21) Appl. No.: 17/839,088

(22) Filed: Jun. 13, 2022

(65) Prior Publication Data

US 2022/0400648 A1 Dec. 22, 2022

Related U.S. Application Data

(60) Provisional application No. 63/213,078, filed on Jun. 21, 2021.

(51) Int. Cl.
*A01K 1/015* (2006.01)
*B01J 20/30* (2006.01)

(52) U.S. Cl.
CPC ......... *A01K 1/0155* (2013.01); *B01J 20/3028* (2013.01)

(58) Field of Classification Search
CPC .......................... A01K 1/0155; B01J 20/3028
See application file for complete search history.

(56) References Cited

U.S. PATENT DOCUMENTS

| | | |
|---|---|---|
| 3,941,090 A | 3/1976 | Fry |
| 4,407,231 A | 10/1983 | Colborn et al. |
| 4,949,672 A | 8/1990 | Ratcliff et al. |
| 4,957,063 A | 9/1990 | Heitfeld et al. |
| 5,016,568 A | 5/1991 | Stanislowski et al. |
| 5,018,482 A | 5/1991 | Stanislowski et al. |
| 5,094,190 A | 3/1992 | Ratcliff et al. |
| 5,097,799 A | 3/1992 | Heitfeld et al. |
| 5,135,743 A | 8/1992 | Stanislowski et al. |
| 5,176,108 A | 1/1993 | Jenkins et al. |
| 5,183,655 A | 2/1993 | Stanislowski et al. |
| 5,189,987 A | 3/1993 | Stanislowski et al. |
| 5,429,073 A | 7/1995 | Ballard |
| 5,992,351 A | 11/1999 | Jenkins |
| 7,343,874 B2 | 3/2008 | Deleeuw et al. |
| 7,523,973 B2 | 4/2009 | Lin et al. |

| | | |
|---|---|---|
| 7,603,964 B2 | 10/2009 | Jenkins et al. |
| 7,776,110 B2 | 8/2010 | Privitera et al. |
| 7,971,720 B2 | 7/2011 | Minkler |
| 8,268,018 B2 | 9/2012 | Privitera et al. |
| 8,387,568 B2 | 3/2013 | Savicki |
| 8,387,793 B2 | 3/2013 | Minkler |
| 8,495,971 B2 | 7/2013 | Ochomogo et al. |
| 9,010,274 B2 | 4/2015 | Drief et al. |
| 9,283,540 B2 | 3/2016 | Fritter et al. |
| 10,058,070 B2 | 8/2018 | Drief et al. |
| 10,212,916 B2 | 2/2019 | Drief et al. |
| 10,383,308 B2 | 8/2019 | Nga et al. |
| 11,076,576 B2 | 8/2021 | Nga et al. |
| 2004/0079293 A1 | 4/2004 | Rasner et al. |
| 2007/0277739 A1* | 12/2007 | Wang ................... A01K 1/0155 119/161 |
| 2011/0185978 A1 | 8/2011 | Dixon et al. |
| 2012/0260860 A1* | 10/2012 | Drief .................... A01K 1/0155 119/173 |
| 2013/0269623 A1* | 10/2013 | Lawson ............... A01K 1/0155 119/171 |
| 2014/0069344 A1 | 3/2014 | Lipscomb et al. |
| 2015/0238931 A1* | 8/2015 | Lipscomb ........... B01J 20/3212 502/404 |
| 2019/0350162 A1 | 11/2019 | Lipscomb et al. |
| 2021/0169037 A1 | 6/2021 | Nuanes et al. |

FOREIGN PATENT DOCUMENTS

| | | |
|---|---|---|
| CN | 102740685 A | 10/2012 |
| CN | 104837337 A | 8/2015 |
| CN | 104854171 A | 8/2015 |
| CN | 107232072 A | 10/2017 |
| CN | 107583623 A | 1/2018 |
| CN | 107821178 A | 3/2018 |
| CN | 111109094 A | 5/2020 |
| WO | 2011/034857 A2 | 3/2011 |

OTHER PUBLICATIONS

Qiu et al., Foods, (2024), v.13, p. 3677.*
International Search Report from corresponding PCT Application PCT/US22/72931, mailed on Sep. 8, 2022, 9 pages.

* cited by examiner

*Primary Examiner* — Yong L Chu
(74) *Attorney, Agent, or Firm* — Workman Nydegger

(57) ABSTRACT

Animal litter comprising composite particles formed from renewable components where the composite particles include starch and dextrin agglomerated together. The dextrin may be included in an amount of from about 10% to about 50% by weight of the composite particles and the starch may be included in an amount of from about 50% to about 90% by weight of the composite particles. The composite particles may optionally include powdered activated carbon. The litter may advantageously be free or substantially free of non-renewable mineral components, and may exhibit a clump retention of at least about 90% and/or a clump strength of at least 1,000 $g_f$.

25 Claims, 6 Drawing Sheets

ANIMAL LITTER MADE FROM RENEWABLE RESOURCES WITH PERFORMANCE BETTER THAN BENTONITE CLAY

CROSS-REFERENCE TO RELATED APPLICATIONS

The present application claims the benefit of U.S. Provisional Patent Application Ser. No. 63/213,078, filed Jun. 21, 2021, the disclosure of which is incorporated by reference in its entirety.

BACKGROUND OF THE INVENTION

1. The Field of the Invention

The present invention relates to litter for use by domestic animals. For example, such litter is typically employed by pet owners to absorb urine and collect feces.

2. Description of Related Art

Many people enjoy the company of one or more domestic pets. Litter boxes are typically provided for the use of such animals in the collection of urine and feces. Such a litter box is typically filled with an absorbent granular material (e.g., sand and/or clay), which aids in collecting the bodily wastes produced by pets. Some existing litter products provide "clumping" capability, by which the litter particles clump together when wetted (e.g., by urine). Sodium bentonite clay is often used in such clumping litter products. While clumping characteristics allow a user to easily remove used clumped litter portions, leaving adjacent unused litter product in the litter box for future use, existing clumping litters are generally based on use of bentonite clay, which is a non-renewable mineral resource.

Another difficulty with existing litter products is a tendency for litter to generate dust while the litter is being poured or otherwise handled. The smallest particles (i.e. fines) produce dust that can be a significant dissatisfier to the consumer when pouring or scooping the litter.

It would be an advancement in the art to provide litter products that were specifically configured to provide clumping, good odor control, and/or low dusting, particularly if such a litter product were formed entirely or substantially entirely from renewable (e.g., plant-based) sources.

BRIEF SUMMARY OF THE INVENTION

While there has been some effort to develop a plant-based litter product that would not require use of sodium bentonite, other clays, or other mined mineral materials, such efforts have not met with significant success for several reasons. One particular problem with such renewable plant-based litter products is that if they clump at all, they tend to form clumps that are significantly inferior in strength to conventional sodium bentonite clumping clay litter products. In addition, even among renewable plant-based litter products that do clump, initial clump strength of such products is typically poor, requiring significant time to improve to an even somewhat acceptable value. In addition, as noted above, even after such time (e.g., 2-3 hours), existing renewable plant-based litter products typically exhibit final clump strength values that are inferior to those provided by sodium bentonite clumping clay litter products, which represent the "gold standard" for clump strength.

Applicant has surprisingly found that a combination of starch and dextrin powder materials can be agglomerated together to form composite particles of the agglomerated starch and dextrin components, where excellent clump strength, including initial clump strength, can be very high, e.g., substantially equal to or even better than that provided by a sodium bentonite clumping clay litter product. As such, an embodiment of the present invention is directed to an animal litter formed from renewable components comprising composite particles including starch and dextrin agglomerated together into the composite particles, wherein the dextrin is included in an amount of from 10% to 50% by weight of the composite particles, and the starch is included in an amount of from 50% to 90% by weight of the composite particles. Such a litter product may be substantially or entirely free of non-renewable mineral components (e.g., sodium bentonite clay, other clays, limestone, etc.). The litter may exhibit a clump retention value of at least 90%. In an embodiment, clump strength (even initial clump strength) may be similar to or greater than that of a clay litter product, e.g., such as at least 1,000 $g_f$. By way of comparative example, a sodium bentonite clumping litter product may provide an initial clump strength of less than 1,000 $g_f$ (e.g., about 750-800 $g_f$), and may take 2-3 hours after initial dosing to reach a clump strength of 1,000 $g_f$. By way of additional comparison, such a sodium bentonite clumping litter product may provide a clump retention value of about 91%, while the present renewable plant-based litter products may provide clump retention of at least 90%, and may even exceed the clump retention provided by the comparative "gold standard" sodium bentonite clumping litter product. For example, the present renewable plant-based litter products may provide clump retention values of at least 91%, at least 92%, at least 93%, at least 94%, at least 95%, at least 96%, at least 97%, or at least 98%.

In an embodiment, the amount of the dextrin may be greater than 10%, such as at least 12%, at least 15%, at least 16%, or at least 18%. In an embodiment, the dextrin may be included in an amount of up to 50%, up to 40%, up to 35%, up to 30%, or up to 25%. The dextrin component may have a relatively low molecular weight, significantly lower than that of the starch component. For example, the molecular weight of the dextrin component may be less than 50,000 g/mol, less than 40,000 g/mol, less than 30,000 g/mol, at least 500 g/mol, or at least 1,000 g/mol, such as from 1,000 g/mol to 30,000 g/mol. The molecular weight of the starch may typically be far higher, e.g., greater than 100,000 g/mol, or greater than 1 million g/mol, such as several tens of millions or higher.

The starch included in the composite particles is generally not pre-gelatinized, but may be native starch powder. In an embodiment, a small portion of pre-gelatinized starch or guar gum (e.g., less than 10%, less than 5%, such as 1%-4%) may be included in the composite particles as a high viscosity builder, which may improve the regularity or uniformity of the clump shapes formed upon wetting of the litter during use.

Because the present litter products are formed from starch and dextrin, rather than typical mineral materials, the litter may have a bulk density value that is significantly lower than typical mineral-based litter products. For example, while mineral litter materials typically provide density values greater than 60 lb/ft³, or greater than 65 lb/ft³ (e.g., sodium bentonite clay has a density of about 68 lb/ft³), the present plant-based renewable litter products may have density values of less than 60 lb/ft³, or less than 50 lb/ft³, such as from 30 lb/ft³ to 50 lb/ft³.

In contrast to the litter product described in Applicant's U.S. Pat. No. 9,010,274, at least some embodiments of the present litter do not rely on inclusion of relatively large flat-shaped cellulosic materials (e.g., wood chips) as described therein. While in some embodiments, wood powder may be included, any such cellulosic wood powder material may be relatively small in particle size (e.g., powdered such as sawdust), rather than being present as relatively large wood chips. In addition, the litter product in U.S. Pat. No. 9,010,274 includes sodium bentonite clay as a coating material over the wood chips to achieve clumping, while the present litter products do not require use of any sodium bentonite to achieve clumping.

Another embodiment of the present invention is directed to a method for forming an animal litter from renewable components as described herein. Such a method may include agglomerating starch powder and dextrin powder with water using a pin mixer or similar high shear agglomeration process to form composite particles including the starch powder and dextrin powder agglomerated together into the composite particles. As described herein, such composite particles may include 10-50% by weight of the dextrin, and 50-90% by weight of the starch. Each composite particle includes both starch and dextrin, in contrast to a dry mixture of such components, where any given particle does not include both components. Substantially no mineral components (e.g., clays such as sodium bentonite, or sand, or limestone) may be present. In an embodiment, the agglomerated particles may further include powdered activated carbon ("PAC"), e.g., as an odor reducing agent.

In an embodiment, a small portion of a pre-gelatinized starch or guar gum (e.g., less than 10%, less than 5%, such as 1%-4%) may be included in the components fed to the pin mixer or other high shear agglomeration process used to form the composite particles. Such a pre-gelatinized starch or guar gum may improve the regularity or uniformity of the clump shapes formed upon wetting of the litter during use.

During such an agglomeration method, water is additionally added, to aid the powder particle components in agglomerating together, within the pin mixer or other high shear agglomeration process. The amount of water added may depend on the amounts or ratio of dextrin to starch included. For example, the amount of water may range from 10% to 60%, or 15% to 50% by weight relative to the dry mass. Generally speaking, the lower the dextrin level, the higher percentage of water that may be needed for agglomeration.

In addition to other benefits as noted herein, the present litter products may exhibit excellent, low dusting characteristics without inclusion of a de-dusting agent, such as PTFE, lignosulfonate or mineral oil. The present litter products may exhibit good clump strength, good clump retention, low dust, relatively low density (e.g., for easier handling), and good absorption characteristics.

While some contemplated composite particles may not include a core and shell structure, other embodiments may include such a core and shell structure. For example, a core of an absorbent renewable material such as one or more of wood, corn cob, corn, bran, grits, almond or walnut hulls, almond or walnut shells, straw, a grain, or another agricultural product particle may be provided, with the starch and dextrin mixture agglomerated together over the core, so that the starch and dextrin agglomerated composite forms a shell over such a core. Such agglomerated core/shell composite particles could be formed using similar methods and processes as described above (e.g., pin mixers, pan agglomerators, etc., by providing the core material, and then agglomerating the starch and dextrin mixture over such core, through addition of water to cause the starch and dextrin powder materials to agglomerate together, over the core material. Such core materials may be significantly larger is size than the powder materials used to form the shell layer thereover.

Further features and advantages of the present invention will become apparent to those of ordinary skill in the art in view of the detailed description of preferred embodiments below.

BRIEF DESCRIPTION OF THE DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail through the use of the accompanying drawings.

DETAILED DESCRIPTION

I. Definitions

Figure 1:
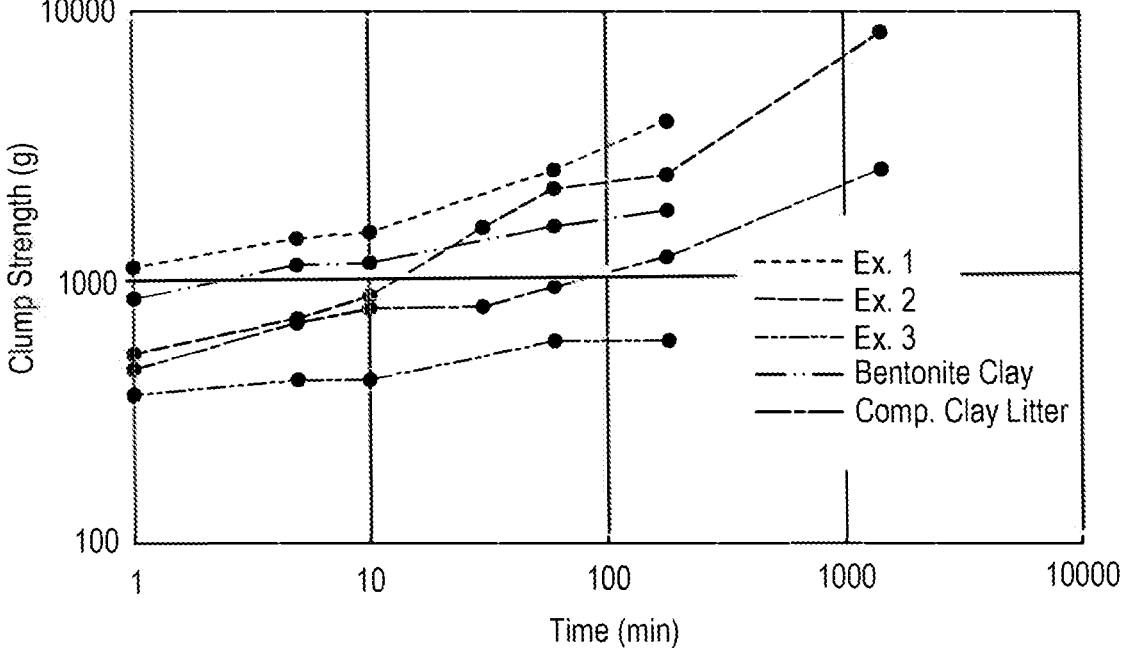
FIG. 1 shows clump strength for two exemplary litter products according to the present invention, as well as various comparative examples.

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising," which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a", "an" and "the" include plural referents unless the content clearly dictates otherwise. Thus, for example, reference to a "starch" includes one, two or more such starches.

Numbers, percentages, ratios, or other values stated herein may include that value, and also other values that are about or approximately the stated value, as would be appreciated by one of ordinary skill in the art. As such, all values herein are understood to be modified by the term "about". A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 10%, within 5%, within 1%, etc. of a stated value.

Some ranges may be disclosed herein. Additional ranges may be defined between any values disclosed herein as being exemplary of a particular parameter. All such ranges are contemplated and within the scope of the present disclosure.

In the application, effective amounts are generally those amounts listed as the ranges or levels of ingredients in the descriptions, which follow hereto. Unless otherwise stated, all percentages, ratios, parts, and amounts used and described herein are by weight, on a dry basis, e.g., so as to exclude any water content.

The phrase "free of", "void of" or similar phrases if used herein means that the composition or article comprises 0% of the stated component, that is, the component has not been intentionally added. However, it will be appreciated that such components may incidentally form thereafter, under some circumstances, or such component may be incidentally present, e.g., as an incidental contaminant.

The phrase "substantially free of", "substantially void of" or similar phrases as used herein means that the composition or article preferably comprises 0% of the stated component, although it will be appreciated that very small concentrations may possibly be present, e.g., through incidental formation, contamination, or even by intentional addition. Such components may be present, if at all, in amounts of less than 1%, less than 0.5%, less than 0.25%, less than 0.1%, less than 0.05%, less than 0.01%, less than 0.005%, less than 0.001%, or less than 0.0001%. In some embodiments, the compositions or articles described herein may be free or substantially free from any specific components not mentioned within this specification.

As used herein, "dextrin" refers to a class of low-molecular-weight carbohydrates that can be produced by the hydrolysis of starch. Dextrins are typically mixtures of polymers of D-glucose units linked by $\alpha$-(1→4) or $\alpha$-(1→6) glycosidic bonds. Dextrin materials as used herein may have a molecular weight of from 1,000 g/mol to 30,000 g/mol.

As used herein, "starch" refers to a polymeric carbohydrate including numerous glucose units joined by glycosidic bonds, as produced by various plants for energy storage. Starch is contained in significant quantities in potatoes, corn, rice, wheat, and other plants. Starch typically includes both linear amylose and branched amylopectin, where the ratio of amylose to amylopectin depends on the plant source, etc. Molecular weight of starch materials is typically very high, e.g., 100,000 g/mol to tens of millions, or higher.

Molecular weight values as provided herein are weight average molecular weights, unless otherwise indicated.

Particle size ranges and distributions as described herein can be determined by typical screening methods known to those of skill in the art.

Bulk density is an important property of animal litter. Bulk density is a property of powders, granules and other "divided" solids. It is defined as the mass of the many particles of the material divided by the total volume they occupy. The total volume includes particle volume, inter-particle void volume and internal pore volume. Bulk density is not necessarily an intrinsic property of a material; it can change depending on how the material is handled. For example, a powder poured into a container will have a particular bulk density; if the container is disturbed (e.g., vibrated), the powder particles will move and usually settle closer together, resulting in a higher bulk density. Bulk density is a measure of the weight of the litter per unit volume ($g/cm^3$ or $lb/ft^3$). One test method used to measure bulk density comprises a hopper with a container (e.g., volume of 1 pint) underneath. The hopper is filled with a given volume (e.g., approximately 2000 $cm^3$) of the sample. The gate situated at the bottom of the hopper is opened to fill the container with material until it overflows. The container is then leveled out using a straight edge tool and the weight is recorded. The same process is repeated twice and an average of three reps is reported ($g/cm^3$ or $lb/ft^3$).

As used herein the term "PAC" means powdered activated carbon that is a fine black powder made from wood or other carbon-containing materials (e.g., coconut, coal, etc.) that have been exposed to very high temperatures in an oxygen free environment and treated, or activated, to increase its ability to absorb by reheating with oxidizing gas or other chemicals. The result is a highly porous fine powder with a particle size less than about 0.25 mm and typically ranging from about 50 to about 150 μm.

As used herein the term "clump retention" means the weight percentage of particles retained in the clump (e.g., after three hours) using the clump retention test method described herein. Synthetic urine comprising a solution of urea, ammonium chloride, and sodium phosphate can be used to evaluate clump retention. The solution can be pH adjusted using 0.2 M hydrochloric acid to a final range pH range of 6.5 to 6.53. Use of such a synthetic urine is designed to mimic the clump performance of actual cat urine. A calibrated programmable peristaltic pump can be used to deliver a desired volume of the synthetic urine onto a bed of test litter. For example, synthetic urine can be dosed onto the litter in 10 mL increments. Six clumps were produced for each measurement. Three clumps were small and contain 10 mL of synthetic urine. Three clumps were large and contain 20 mL of synthetic urine. One hour after initial dosing, the peristaltic pump was used to re-dose half of the clumps, to produce the larger clumps. All clumps were allowed to cure for a total time of 3 hours (i.e., the small clumps had 3 hours since their only dosing, while the large clumps had 3 hours from their initial dose, and 2 hours from their final dose). After curing, all clumps were gently scooped from the box and placed on a ½" sieve. The clumps were shaken using a Ro-Tap with the hammer disengaged. The mass of the clumps was recorded before and after agitation on the Ro-Tap. Clump retention was calculated as final weight divided by initial weight and reported in percent.

As used herein the term "clump strength" means the strength of the clump after a given period of time (e.g., 10 min, 30 min, 1 hour, 3 hours, etc.) using the clump strength test method described herein. A TA.HDplusC Texture Analyser was used to measure the clump strength of each clump.

First, a solution of synthetic urine was prepared as described above. 10 mL of synthetic urine was dosed onto a bed of litter using a calibrated programmable peristaltic pump. Clumps were allowed to cure for the noted time (e.g., 10 min, 30 min, 1 hour, 3 hours, etc.). Each clump was removed from the bed of litter and placed on the stage of the Texture Analyser. A TA-42 knife blade probe with 45° chisel end was affixed to the machine. Clumps were positioned upside down with the longest diameter in the x-y plane aligned to the probe. The probe was lowered until just touching the clump. The program was set such that the probe descends to 3 mm from the stage. Force measurements throughout this height range are recorded in grams-force ($g_f$). A peak force measurement was extracted graphically from the resulting force-height plot. Typically, three replicates are averaged together to produce one clump strength measurement.

Methods for creating the composites disclosed herein include, without limitation, a pan agglomeration process, a high shear agglomeration process, a low shear agglomeration process, a high pressure agglomeration process, a low pressure agglomeration process, a rotary drum agglomeration process, a mix muller process, a roll press compaction process, a pin mixer process, a batch tumble blending mixer process, an extrusion process or a fluid bed process. Any of such may be used to provide "agglomeration" as described herein. The agglomeration process in combination with the materials used allows the manufacturer to control the physical properties of particles, such as bulk density, dust, strength, as well as particle size distribution (PSD) without changing the fundamental composition and properties of the component particles.

A high shear or low shear agglomeration process may be used for agglomeration. Such high shear and low shear agglomeration processes refer to high speed, conditioning and micro-pelletizing processes that converts powder (e.g., starch and dextrin powders) into small agglomerates through the addition of water (e.g., and high speed) to cause the powder components to agglomerate together to form composite particles. As used herein the term "component" when used in conjunction with a composite particle means a small particle of one material that was combined with other small particles of itself and/or of small particles of different materials to form a composite particle. Such processes may use a pin mixer, a pan agglomeration process, a rotary coating process, a rotary drum agglomeration process, a mix muller process, a roll press compaction process, a batch tumble blending mixer process, or the like to form discrete composite particles.

In an embodiment, the process and resulting product is differentiated from that described in US2014/0069344, e.g., which uses a high temperature and high pressure extrusion process, and which describes in-situ formation of dextrin due to the extrusion conditions, rather than addition of relatively high fractions of an actual dextrin powder as contemplated in the present invention, which is homogenously distributed throughout the composite particle (e.g., rather than concentrated at an exterior surface or elsewhere within only a portion of such particle). Such extrusion may likely result in a product that is of relatively higher density, which may be "glassy" and/or crystalline, and which requires a subsequent milling step to provide the desired litter characteristics. Such extrusion processes are significantly more energy intensive than the agglomeration processes employed in preparation of the present examples.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II. Introduction

The present invention relates to litter products, including composite absorbent particles that comprise powdered starch and powdered dextrin. In an embodiment, at least some of the composite particles may also include PAC. In particular, Applicant has surprisingly found that by using a blend of both starch and dextrin in the agglomeration components fed to the pin mixer or other high shear agglomeration process, that a clumping litter product providing high clump strength and clump retention can be formed. Such is surprising, given that previous attempts to provide a clumping litter product with clump retention and clump strength similar to that provided by sodium bentonite clay litter products has not been possible. For example, the present processes and litter products provide a 100% plant-based clumping litter product that provides clumping characteristics similar to, or even superior to sodium bentonite litter, which represents the current "gold standard" for clumping litter products.

It is particularly surprising that clump retention values of at least 90%, clump strength values that are similar to or better than that provided by conventional clay litter (e.g. the present litter product may provide a clump strength of at least 1,000 $g_f$). Significant reductions in dust generation are possible as compared to conventional litter products. Such low dusting is achieved even without inclusion of any de-dusting agent, such as PTFE, lignosulfonate or mineral oil.

Such litter products may advantageously provide absorbency values of at least 0.45 g of urine or other liquid per g of litter (i.e., g liquid/g litter). Such absorbency values may be similar to, or even superior to that provided by sodium bentonite litter. In addition to such excellent properties relating to clump retention, clump strength, low dust, and absorbency, the present litter products may exhibit bulk density values that are significantly lower than that associated with sodium bentonite litter products, which are relatively heavy. For example, sodium bentonite litter may have a bulk density of about 68 lb/ft³, while the present litter products may have bulk density values of less than 60 lb/ft³, or less than 50 lb/ft³, such as from 30 to 50 lb/ft³. Such reduced density values improve the ease with which consumers can move, dispense, and clean up such litter products.

III. Exemplary Litter Products and Their Components a. Composite Particles

A composite particle is a discrete particle formed by the agglomeration of smaller component particles. By way of example, components that may be included in such composite particles include, but are not limited to, powdered starch, powdered dextrin, and PAC. The composite particles and the litter as a whole may advantageously be free from inorganic mineral-based litter components which are not renewable, such as sodium bentonite or other clay materials, limestone, dolomite, calcite, calcium carbonates, sand, shale, gravel, and slate. In addition, the present composite particles may be free from large sized cellulose materials (e.g., wood chips) such as described in U.S. Pat. No.

9,010,274. Indeed, in some embodiments, the composite particles themselves may be free of even powdered small particle cellulose materials.

While such materials (e.g., cellulose or inorganic mineral-based components) may not be present within the composite particles themselves, it will be appreciated that the litter product comprising the composite particles may optionally be dry mixed (e.g., a "salt-pepper" blend) with any of a wide variety of materials, including those mentioned above. For example, in an embodiment, the composite particles as described herein may be dry mixed with wood particles (e.g., sawdust or wood chips) or other agricultural product particles (e.g., pulp, corn cob, bran, grits, almond or walnut hulls, almond or walnut shells, or any of a variety of other grains) to further reduce bulk density. In an embodiment, the litter product as a whole (not just the composite particles thereof) is void or substantially void of inorganic mineral-based litter components (e.g., particularly clays such as sodium bentonite). For example, the litter product may be entirely free or substantially free of components that are not renewable plant-based materials.

Composite particles can be formed using a high shear or other agglomeration process including, but not limited to, a pin mixer or the like where the agglomeration process is used to form the discrete composite particles. A pin mixer is a pin-type, high speed, conditioning and micro-pelletizing device that converts small particles (i.e., powders) into larger, discrete agglomerates ("composite particles") through the action of high speed and the addition of a binder, which can be a simple binder such as water. Other agglomeration processes include but are not limited to pan agglomerators, disc pellitizers, drum granulators or pugmills.

Such agglomeration processes and the composite particles they produce are described in Applicant's U.S. Pat. Nos. 9,283,540 and 10,383,308, each of which is herein incorporated by reference in its entirety. Such processes differ from extrusion type processes, e.g., as described in US 2014/0069344, in that such pin mixers and other agglomerators apply high or low shear and use of water as a binder, to cause the small powder component particles of starch and dextrin to agglomerate together, e.g., forming a composite particle that may be substantially homogenous in that the various powder particle components of starch and dextrin are substantially homogeneously distributed throughout the resulting composite particle. Extrusion processes are different in that they operate under elevated temperature and pressure conditions, to mix (and often chemically react) the various components present within the extrusion system. In addition, the extrusion process described in US 2014/0069344 does not actually result in a litter capable of clumping by itself, but requires application of a sodium bentonite clay coating over the extruded pellets, in order to cause the pellets to be capable of clumping.

The presently described process is advantageously simple, and does not require elevated temperature or pressure conditions, but simply acts to mix the powder components (e.g., starch, dextrin, and optionally PAC) with water under high shear conditions to cause the small powder particles to agglomerate together, to form larger composite particles. When using fractions of starch and dextrin as described herein, composite particles can be formed that are capable of serving as a clumping litter product.

All components (e.g., starch, dextrin, and PAC) used in forming the composite particles typically are of initially very small particle sizes, so as to be accurately described as powders. They are smaller than "granular" materials that may optionally be dry blended with the composite particles, or granular materials that are used in dry mixed litter products. Particles this small can contribute to dusting problems, if not agglomerated into composite particles.

The composite particles contain (relative to each other) approximately the same level of the various components used to form such particles. Furthermore, such composite particles typically do not include a core and shell structure, but a relatively homogenous distribution of the powder components from which the composite particle is formed, where each composite particle includes each component used in forming the composite particles. That said, core and shell structures are possible, as described herein (e.g., a core of an absorbent renewable material such as one or more of wood, corn cob, corn, bran, grits, almond or walnut hulls, almond or walnut tshells, straw, a grain, or another agricultural product particle), with the starch and dextrin mixture agglomerated together over the core, so that the starch and dextrin agglomerated composite forms a shell over such a core.

The composite particles are larger than their constituent components and may have particle sizes ranging from about 300 μm (0.3 mm) to about 3350 μm (3.35 mm) (i.e., 6/50 mesh) or from about 300 μm (0.3 mm) to about 1700 μm (1.7 mm) (i.e., 12/50 mesh), or from about 300 μm (0.3 mm) to about 1180 μm (1.18 mm) (16/50 mesh). Applicant's U.S. application Ser. No. 17/112,779 filed Dec. 4, 2020, which application is herein incorporated by reference in its entirety, describes how benefits of improved dusting, clump geometry, and more efficient clumping are obtainable when a particle size distribution of 16/50 mesh is selected for a litter product.

i. Powdered Starch

The composite particles include a powdered starch component. The powdered starch has small particle sizes as described herein, for example no larger than 200 mesh (75 μm), no larger than 280 mesh (44 μm), no larger than 320 mesh (36 μm) or no larger than 400 mesh (23 μm). By way of example, the powdered starch may have particle sizes similar or smaller to that of any PAC incorporated into the composite particles (e.g., from 50-150 μm). Such sizes are significantly smaller than the resulting composite particles within which the starch component is integrated. Inclusion of the powdered starch in the fractions described herein aids in providing an absorbent litter product capable of good absorption and strong clumping, similar or superior to the clumping characteristics of a sodium bentonite litter product. By way of example, the starch may be present in the composite particles in an amount of at least 50% by weight, such as up to 90% by weight. In an embodiment, the starch may be present in an amount of at least 55%, 60%, 70%, 75%, 80% or 85% by weight. The starch may be present in an amount of no more than 85%, 80%, 75%, 70%, 65%, 60%, or 55% by weight. Exemplary ranges include, but are not limited to 50% to 90%, 55% to 85%, 60% to 80%, or 65% to 75% by weight of the composite particles. Such fractions are on a dry basis (e.g., not including any residual water that may be present within the finished composite particles).

A variety of starch materials can be used, e.g., including but not limited to starches sourced from corn, potato, pea, wheat and the like.

ii. Powdered Dextrin

The composite particles include powdered dextrin in addition to powdered starch. While composite particles formed entirely from starch, or entirely from dextrin do not result in a clumping litter product, use of powdered starch and powdered dextrin in concentrations as described herein advantageously provide a litter product exhibiting low dusting as well as excellent clumping and absorption characteristics. Like the starch component, the powdered dextrin has small particle sizes as described herein, for example no larger than 200 mesh (75 μm), no larger than 280 mesh (44 μm), no larger than 320 mesh (36 μm) or no larger than 400 mesh (23 μm). By way of example, the powdered dextrin may have particle sizes similar or smaller to that of any PAC incorporated into the composite particles (e.g., from 50-150 μm). Inclusion of the powdered dextrin in the fractions described herein allows the resulting composite particle litter product to exhibit strong clumping, similar or superior to the clumping characteristics of a sodium bentonite litter product. By way of example, the dextrin may be present in the composite particles in an amount of more than 10% by weight, such as up to 50% by weight. In an embodiment, the starch may be present in an amount of at least 12%, 15%, 16%, 18%, 20% 25%, 30%, 35%, 40%, or 45% by weight. The dextrin may be present in an amount of no more than 50%, 45%, 40%, 35%, 30%, 25%, or 20% by weight. Exemplary ranges include, but are not limited to 10% to 50%, 15% to 45%, 15% to 40%, or 20% to 40% by weight of the composite particles. Such fractions are on a dry basis (e.g., not including any residual water that may be present within the finished composite particles). The composite particles may consist essentially of starch and dextrin, with PAC optionally being present. Minor additives (e.g., preservatives, fragrances, colorants, dyes or pigments) and the like may be added.

The dextrin component may have a relatively low molecular weight, significantly lower than that of the starch component. For example, the molecular weight of the dextrin component may be less than 50,000 g/mol, less than 40,000 g/mol, less than 30,000 g/mol, at least 500 g/mol, at least 1,000 g/mol, such as from 1,000 g/mol to 30,000 g/mol. The molecular weight of the starch may typically be far higher, e.g., greater than 100,000 g/mol, or greater than 1 million g/mol, such as several tens of millions.

A variety of dextrin materials can be used, e.g., including but not limited to dextrins derived from corn, potato, pea, wheat and the like. In an embodiment, the dextrin may be sourced from a different plant as compared to the starch (e.g., corn starch and wheat dextrin).

iii. Powdered Activated Carbon (PAC)

The composite particles can include a powdered activated carbon (PAC) component. Powdered activated carbon is a fine black powder made from wood or other organic carbon-containing materials (e.g., coconut, coal, etc.) that have been exposed to high temperatures in a reduced or oxygen free environment and treated, or activated, to increase the material's surface area by heating in the presence of an oxidizing gas or other chemicals. The result is a highly porous fine powder with small particle sizes (e.g., from about 40 μm to about 150 μm), which material is capable of absorbing odor causing volatile compounds.

The inclusion of PAC or a similar odor control agent in the composite particle increases the odor control properties of the present litter compositions. Inclusion of the PAC within the composite particle provides excellent odor control properties, without inclusion of separate and discrete very small carbon particles dry blended in the litter composition. In an embodiment, the PAC can be included in the composite particles or the litter product as a whole in an amount of from 0.1% to 5%, from 0.25% to 3%, or from 0.5% to 1% by weight. Where PAC is included in the litter product, it is not necessary that the PAC be included in each composite particle. For example, in an embodiment, the litter product may include composite particles that include PAC, along with composite particles that do not include PAC. For example, two different types of composite particles can be prepared, and then dry blended together (e.g., one type with PAC, and one type without). By way of example, where two types of composite particles are dry mixed together, e.g., at a 1:1 ratio, the composite particles including the PAC may include PAC at double the concentration that the PAC is included relative to the litter product as a whole (e.g., 1% vs. 0.5%, or 2% vs. 1%).

iv. Pre-Gelatinized Starch or Other High Viscosity Builder

The majority of the included starch is not gelatinized. That said, in an embodiment, a small portion of the starch may be pre-gelatinized. By way of example, such a pre-gelatinized starch may be included in an amount of less than 10% or less than 5%, such as 1% to 4% by weight of the composite particles. Inclusion of such a component may serve to increase viscosity, and improve the regularity or uniformity of the clump shapes formed upon wetting of the litter during use. Such a component may also serve to decrease brittleness of the resulting clumps. Other high viscosity builders may be suitable for use as an alternative, or in addition to use of pre-gelatinized starch. A non-limiting example of such is guar gum. Although inclusion of such a pre-gelatinized starch may decrease initial clump strength to some extent, initial clump strength is still acceptable, and quickly increases to a value of 1,000 $g_f$ or higher.

b. Optional Wood Particles

Optionally, the litter product may include wood particles as an absorbent filler material, serving to further reduce the bulk density of the litter product. By way of example, any such included wood particles may be dry mixed with finished composite particles, rather than incorporated into the composite particles. In another embodiment, wood particles may optionally be incorporated into the mixture of components fed to the pin mixer, for incorporation into the finished composite particles. That said, it may be preferable to include any wood particles as a separate component of a dry mix with the composite particles, rather than incorporating such into the composite particles, to improve overall clumping properties of the litter product. Within such a dry blend, random and relatively consistent particle distribution of discrete particles of the two or more types exist throughout the mixture. Any included dry blended wood particles may be the same size as the composite particles (e.g., having a particle size distribution of 6/50 mesh, 12/40 mesh, 12/50 mesh, 16/50 mesh, or other desired particle size distribution. For example, in the present examples, the added wood particles were between 12 and 40 mesh (i.e., 12/40 mesh)

The composite particles could be dry blended with wood particles or any other desired particles in any desired weight ratio or volume ratio. By way of example, such wood particles may be included in a dry blended product in an amount of up to 30%, up to 25%, up to 20%, up to 15%, or up to 10%, such as from 1% to 30%, from 3% 25%, from 5% to 20%, or from 5% to 15% (e.g., about 10%).

c. Clumping Characteristics

By way of example, the litter product may exhibit a clump retention of at least 90%, at least 91%, at least 92%, at least 93%, at least 94%, at least 95%, at least 96%, at least 97%, or at least 98%. Such values are very high, e.g., as high, or higher than clump retention values provided by sodium bentonite clumping litter products.

In an embodiment, clump strength (even initial clump strength at 1 minute, or 10 minutes after wetting) may be at least 1,000 $g_f$ and/or similar or better than that provided by a sodium bentonite clay litter product. By way of comparison, a sodium bentonite clumping litter product may provide an initial clump strength of less than 1,000 $g_f$ (e.g., about 750-800 $g_f$), and may take 2-3 hours after initial dosing to reach a clump strength of 1,000 $g_f$. The present litter products may provide a clump strength of at least 1,000 $g_f$, at least 1,200 $g_f$, at least 1,500 $g_f$ or at least 2,000 $g_f$ such as from 1,000 $g_f$ to 10,000 $g_f$, or from 1,000 $g_f$ to 8,000 $g_f$. Such values may be for initial clump strength (e.g., immediately after wetting, at 1 minute, or at 10 minutes), or after a given cure time (e.g., 30 minutes, 1 hour, 2 hours, 3 hours, etc.). The clump strength of the present litter compositions is advantageously relatively high shortly after wetting (e.g., even within 10 minutes), and becomes even stronger after a short period of time (e.g., 2-3 hours). As a result, when a user cleans out a litter box (e.g., once a day or other frequency), the clumps that have formed will exhibit high clump strength and clump retention values, to as to remain intact, rather than crumbling or otherwise breaking apart, or being "mushy", both of which are undesirable.

By way of example, the litter product may exhibit a clump weight of no more than about 50 g, no more than 40 g, or no more than about 30 g, (e.g., 15 to 40 g may be typical) when dosed with 10 g (or 10 mL) of water or urine. Such clump weights (e.g., and those reported in FIG. 3A and elsewhere herein) may include the weight of the dosing liquid.

The present litter product may exhibit an absorbency that is equal to or greater than a sodium bentonite litter product. By way of example, the litter may have an absorbency of at least 0.45 g liquid/g litter, at least 0.50 g liquid/g litter, or from 0.45 to 1 g liquid/g litter. Such increased absorbency results in a more efficient use of the litter product, as less litter product is required to absorb a given volume or mass of liquid.

Bulk density of the present litter products is advantageously relatively low, by comparison to existing sodium bentonite clay litter products, which are heavy. For example, sodium bentonite litter has a bulk density of about 68 lb/ft$^3$. The present litter products may have a bulk density of less than 60 lb/ft$^3$, less than 50 lb/ft$^3$, such as from 30 to 50 lb/ft$^3$.

d. Low Dusting Characteristics

In an embodiment, the litter composition may be free or substantially free of fine particles that would pass through a size 100 mesh (e.g., 0.150 mm or 150 μm sieve opening). For example, as manufactured, or after shipping to a retailer or consumer, the composition may not include more than about 10%, more than about 5%, more than about 4%, more than about 3%, more than about 2.5%, more than about 2%, more than about 1.5%, or more than about 1% of such fines. The presence of such fines can lead to increased dust. For example, such fines contribute to dust generation when pouring such a litter product. While some amount of fines smaller than the lower end cut-off (e.g., 40 mesh, 50 mesh or other value) may eventually form due to attrition of larger particles, the present litter products have been found to provide for excellent low dusting characteristics, even without inclusion of a de-dusting agent, such as PTFE, lignosulfonate or mineral oil.

By way of example, the litter product may generate no more than about 20 mg, no more than about 15 mg, no more than about 10 mg, or no more than about 5 mg of dust in a gravimetric dust measurement, with a 850 cm$^3$ litter sample. The gravimetric dust measurement test measures the tendency of a litter product to generate dust during a consistent pouring from a specific height and duration. Two 850 cc samples of each litter product to be tested were weighed out. Whatman Qualitative Grade 4 Filter paper of a standardized size (e.g., 9"×4") was provided, and its initial weight recorded. The gravimetric dust measurement unit includes an enclosure which is fitted with a drop funnel and slide gate assembly used to drop the litter into a vessel in the enclosure. An external fan is used to pull air from the enclosure through the filter paper holder assembly, trapping the dust in the filter paper. The filter paper was placed into the sample holder on the gravimetric dust measurement unit, and the litter product to be tested was poured into the cone at the top of the gravimetric dust measurement unit. The vacuum fan of the gravimetric dust unit was activated, and after 5 seconds, the slide gate under the cone was opened, allowing the litter in the cone to fall. The vacuum was allowed to run for 30 seconds after the lever was opened (35 seconds total). After shutting off the vacuum fan, the sample holder was opened, and the filter paper removed. The filter paper including dust captured therein was reweighed. The difference between the initial weight and the final weight (in mg) is the amount of dust generated for the 850 cm$^3$ sample.

Mesh sizes and particle sizes will be familiar to those of skill in the art. Various mesh size characteristics are shown below in Table 1.

TABLE 1

| Sieve Size (mm) | Opening (μm) | U.S. Standard Mesh Size |
|---|---|---|
| 5.60 | 5600 | 3.5 |
| 4.75 | 4750 | 4 |
| 4.00 | 4000 | 5 |
| 3.35 | 3350 | 6 |
| 2.80 | 2800 | 7 |
| 2.36 | 2360 | 8 |
| 2.00 | 2000 | 10 |
| 1.70 | 1700 | 12 |
| 1.40 | 1400 | 14 |
| 1.18 | 1180 | 16 |
| 1.00 | 1000 | 18 |
| 0.85 | 850 | 20 |
| 0.71 | 710 | 25 |
| 0.60 | 600 | 30 |
| 0.50 | 500 | 35 |
| 0.425 | 425 | 40 |
| 0.355 | 355 | 45 |
| 0.300 | 300 | 50 |
| 0.25 | 250 | 60 |
| 0.212 | 212 | 70 |
| 0.180 | 180 | 80 |
| 0.15 | 150 | 100 |
| 0.125 | 125 | 120 |
| 0.105 | 105 | 140 |
| 0.090 | 90 | 170 |
| 0.075 | 75 | 200 |

The present litter products may employ any desired particle size cutoffs, e.g., such as, but not limited to 6/50, 12/50, 16/50, 8/40 or 12/40 wherein particles sized larger the first number and fines sized smaller than the second number are rejected. For example, cutoffs of 6/50 correspond to a litter that will pass through a 6 mesh screen but be retained on a 50 mesh screen.

IV. Examples and Experimental Results

FIG. 1 shows clump strength for two exemplary litter products (Examples 1 and 2) according to the present invention, as well as various comparative examples (Example 3, sodium bentonite clay, and a comparative commercial clay litter comprising limestone and bentonite clay. The litter product of Example 1 was in the form of composite particles formed from 80% dent corn starch and 20% wheat dextrin. The litter product of Example 2 was also in the form of composite particles, formed from 80% dent corn starch, 2.5% pre-gelatinized dent corn starch, and 17.5% wheat dextrin. The litter product of Example 3 was also in the form of composite particles, formed from 80% dent corn starch and 20% pre-gelatinized dent corn starch. The comparative sodium bentonite clay litter product is 100% sodium bentonite granular clay (not composite particles). The comparative commercial clay litter comprising limestone and bentonite clay is a composite particle litter product formed from 70% sodium bentonite clay and 30% limestone.

As shown in FIG. 1, both Examples 1 and 2 provide good clump strength, even initially, where clump strength increases quickly, which is unusual for a plant-based non-mineral litter product. As shown in FIG. 1, the clump strength of Example 1 exceeds that of the sodium bentonite clay and the comparative commercial clay litter comprising limestone and bentonite clay at all times. Example 2 initially has a clump strength that is less than the comparative sodium bentonite clay, but the clump strength of this litter builds quickly, surpassing the clump strength of sodium bentonite clay within 30 minutes. The clump strength of Example 2 is slightly greater than that of the comparative commercial clay litter comprising limestone and bentonite clay product at 1 min, 5 min, and 10 min, after which the clump strength of Example 2 increases significantly faster than that of the comparative commercial clay litter comprising limestone and bentonite clay.

While the inclusion of a small fraction of pre-gelatinized starch in Example 2 slightly reduces initial clump strength, it was noted that it also improved the regularity and uniformity of the geometry of the resulting clump, and as noted, clump strength increases quickly so that by the time a typical user will remove clumps from the litter box, the clumps will be stronger than clumps of the sodium bentonite clay litter product. Like Example 1, Example 2 shows higher clump strength at all times, as compared to the comparative commercial clay litter comprising limestone and bentonite clay litter product. The measurements seen in FIG. 1 were taken at 1 min, 5 min, 10 min, 30 min, 60 min, 180 min, and 1440 min after dosing the respective litter product with 10 mL of synthetic urine, using the procedures as described herein.

As shown, the strength of Example 1 was at all points greater than 1,000 $g_f$, while the strength of Example 2 was nearly 1,000 $g_f$ after 10 minutes, and far exceeded 1,000 $g_f$ after 30 minutes. Example 3 is included to show the importance of inclusion of the dextrin component, as Example 3 included composite particles formed from 80% corn starch and 20% pre-gelatinized corn starch, with no dextrin. As shown in FIG. 1, the clump strength of Example 3 is significantly lower than Examples 1 and 2, and never reaches 1,000 $g_f$, or exceeds that of the sodium bentonite clay or comparative commercial clay litter comprising limestone and bentonite clay comparative litter products.

Figure 2:
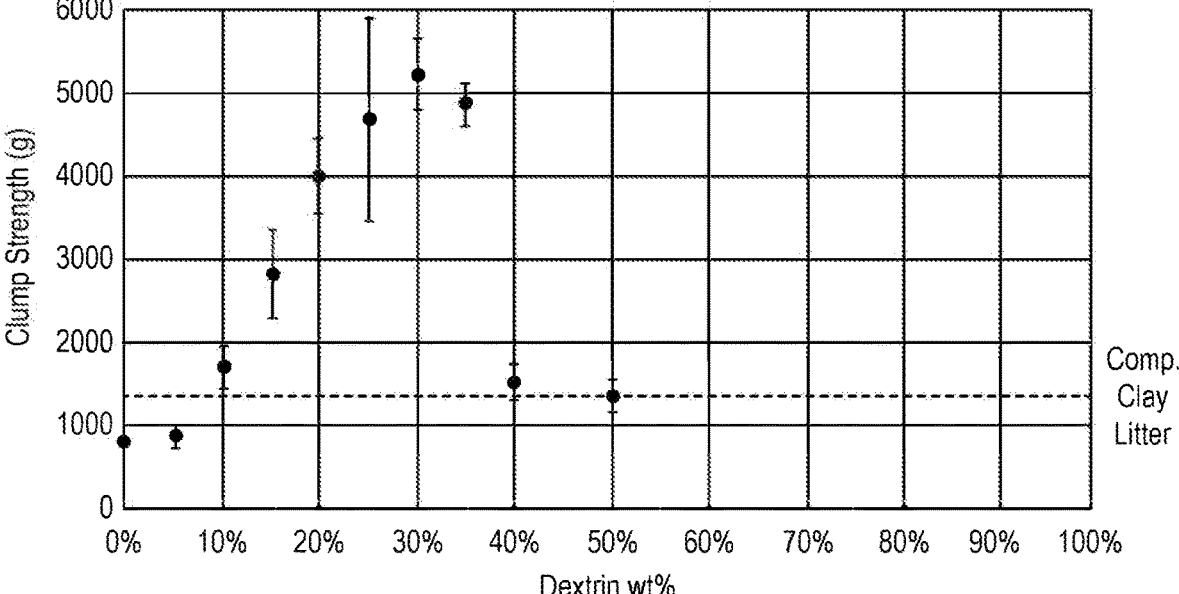
FIG. 2 shows clump strength for exemplary litter products at varying dextrin levels.

FIG. 2 shows clump strength for exemplary litter products at varying dextrin levels, from 5% up to 50% dextrin, 3 hours after dosing with 10 mL of synthetic urine. The clump strength values seen in FIG. 2 are for a formulation similar to that of Example 1, where the composite particles include dextrin and starch, without the inclusion of any pre-gelatinized starch. The horizontal dashed line indicates the clump strength for the comparative commercial clay litter comprising limestone and bentonite clay, which is at about 1,300 $g_f$. As shown in FIG. 2, the starch and dextrin composite particle litter product exhibits clump strength that is equal to or superior to the comparative commercial clay litter comprising limestone and bentonite clay litter product at all dextrin levels from 10% to 50% (and thus starch levels from 50% to 90%). The vertical bars seen in FIG. 2 denote the standard deviation for the respective average data points.

Figure 3A:
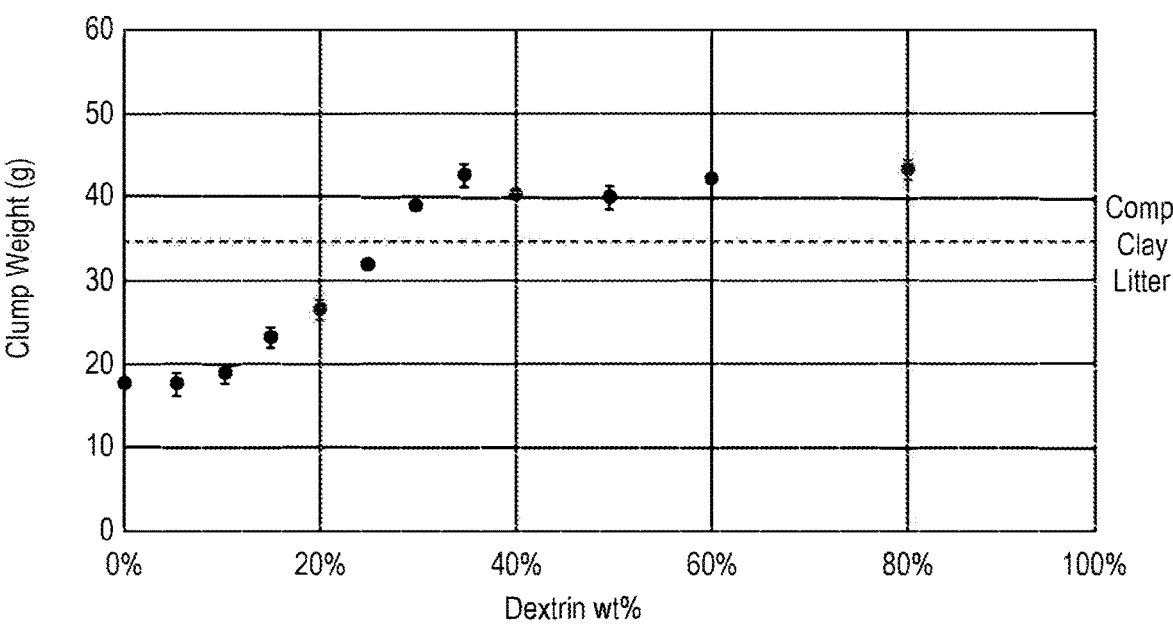
FIG. 3A shows clump weight for exemplary litter products at varying dextrin levels.

FIG. 3A shows clump weight for exemplary litter products at varying dextrin levels, using the same simple formula as used in FIG. 2 (i.e., composite particles formed from starch and dextrin). The data in FIG. 3 was generated by dosing the litter product to be evaluated with 10 mL of synthetic urine, and allowing the resulting clump to set (e.g., 15 minutes). The resulting clumps were weighed and the results are reported in FIG. 3A. Dextrin concentrations of 0%, 5%, 10%, 15%, 20%, 25%, 30%, 35%, 40%, 50%, 60%, and 80%, with the balance being starch, were evaluated. As shown, dextrin concentration values of 25% and less provided clump weights that were less than the 34.3 g clump weight provided by the comparative commercial clay litter comprising limestone and bentonite clay litter product. Such reduced clump weights mean that the exemplary litter products including 10-25% dextrin are more efficient in clump formation than the comparative commercially available litter product comprising limestone and bentonite clay. The reported clump weight values are on a "wet basis", including the weight (e.g., 10 g) of the dosing synthetic urine.

Figure 3B:
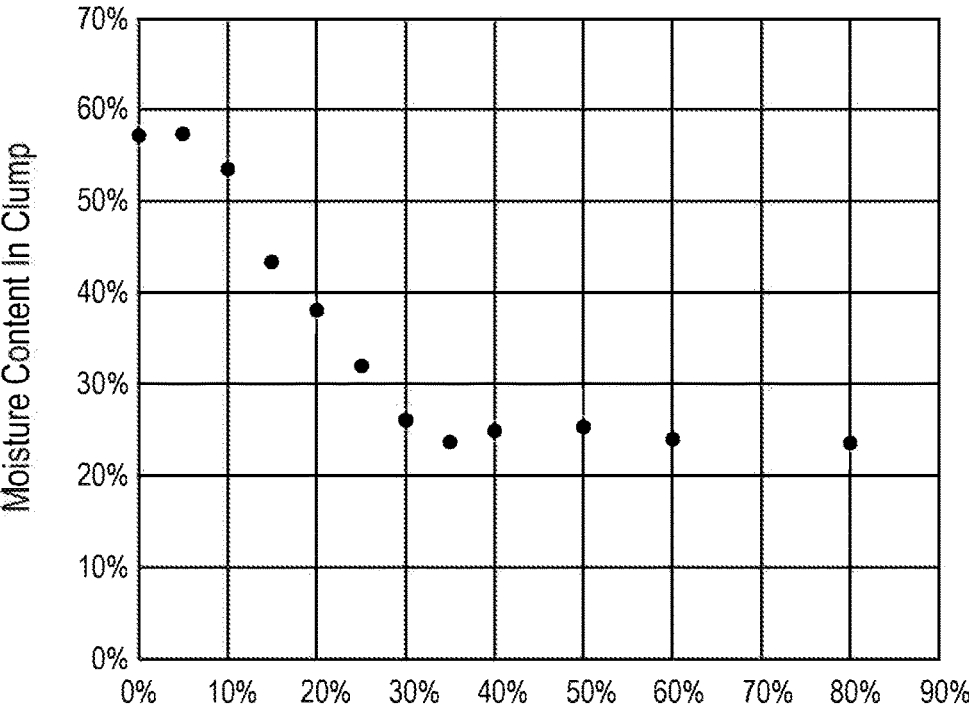
FIG. 3B shows moisture content in the clump at varying dextrin levels.

FIG. 3B shows moisture content in the clump at varying dextrin levels, illustrating how the present composite particle litter products are very efficient in clump formation, particularly at dextrin levels of up to 30%, or up to 25% (e.g., 10% to 30%, or 10% to 25% dextrin).

Figure 4:
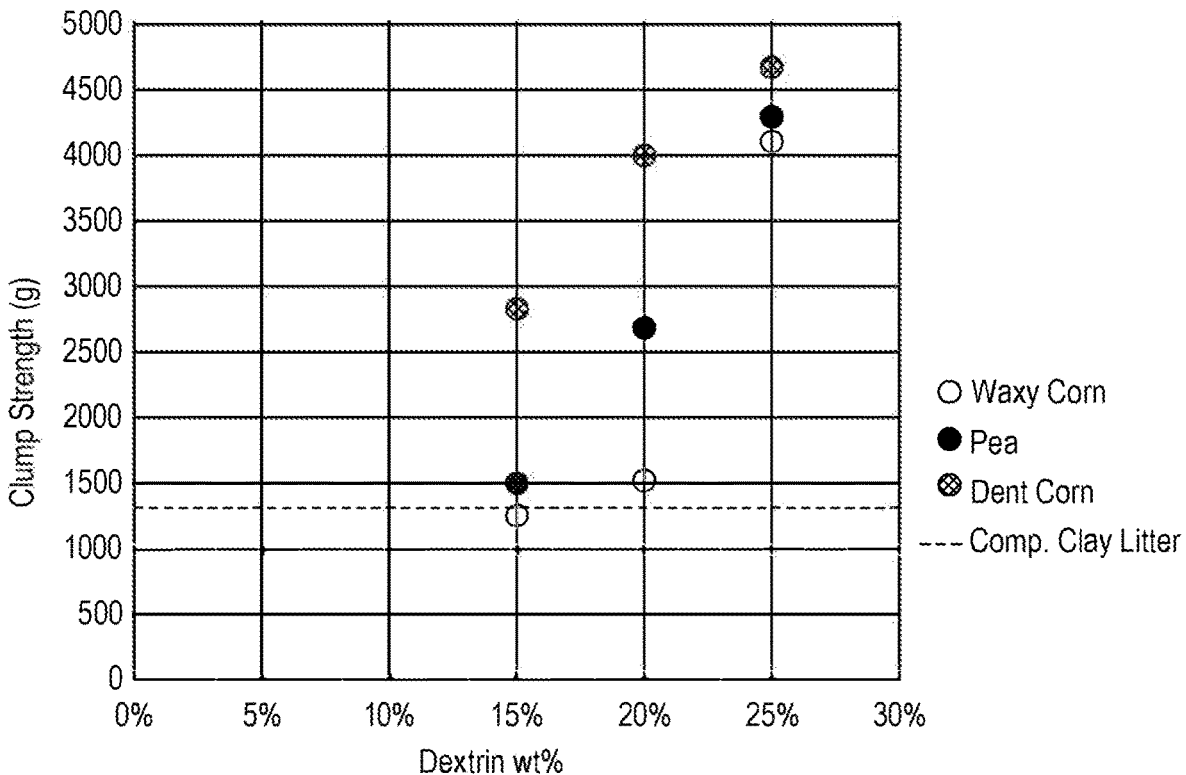
FIG. 4 shows clump strength for starches sourced from different plant materials, at varying dextrin levels.

FIG. 4 shows clump strength for starches sourced from different plant materials, at varying dextrin levels. Each sample was formed from the noted starch material (not pre-gelatinized), and wheat dextrin in the noted amount (e.g., 15%, 20%, or 25% dextrin). The horizontal line shows clump strength for the comparative commercial clay litter product comprising limestone and bentonite clay (i.e., at about 1,300 $g_f$). The results in FIG. 4 show that a variety of starches (e.g., dent corn, waxy corn, or pea) are suitable for use, to achieve good clump strength values.

Figure 5:
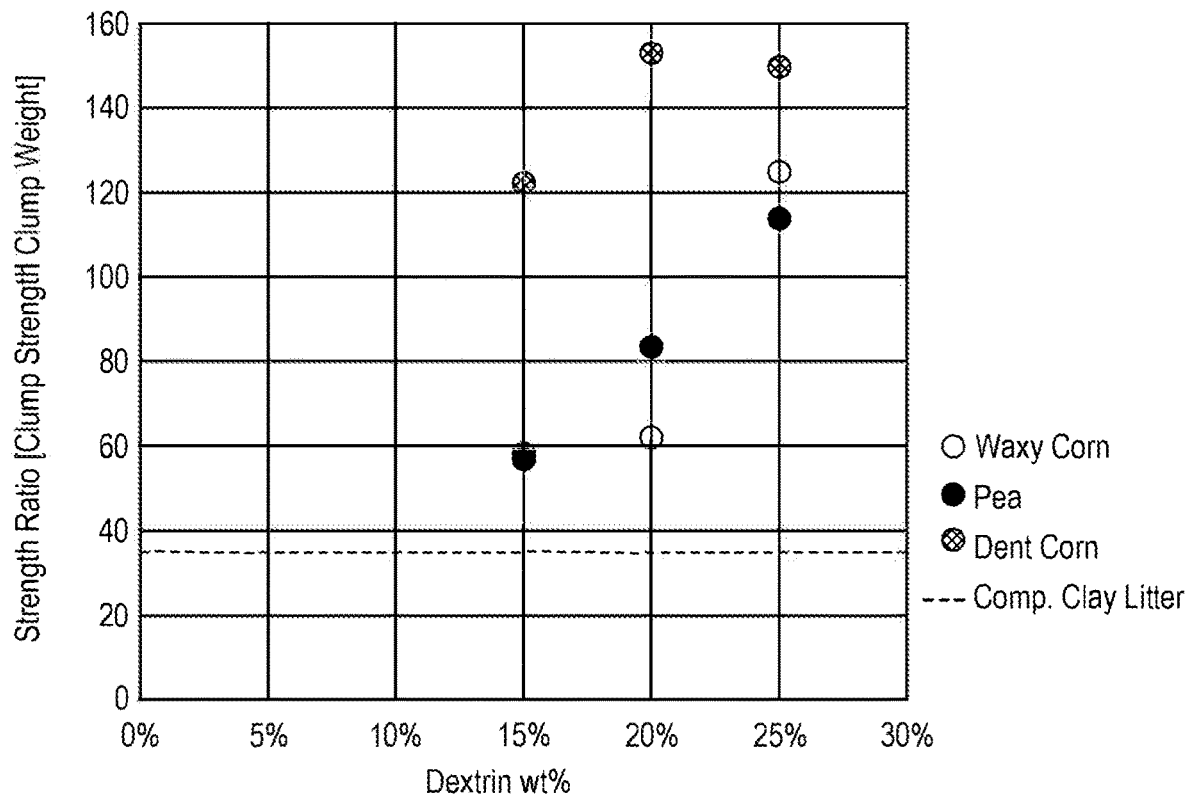
FIG. 5 shows strength ratio (clump strength to clump weight) for the same variety of different starch materials from FIG. 4, at varying dextrin levels.

FIG. 5 shows strength ratio (clump strength to clump weight) for the same variety of different starch materials as shown in FIG. 4, at the same dextrin levels of 15%, 20%, and 25% by weight. The data in FIG. 5 normalizes clump strength for litter products providing different absorbency. The data reveal that dent corn starch performs better than waxy corn starch or pea starch, but that all such starches provide higher strength ratios than the comparative commercial clay litter product comprising limestone and bentonite clay.

Figure 6:
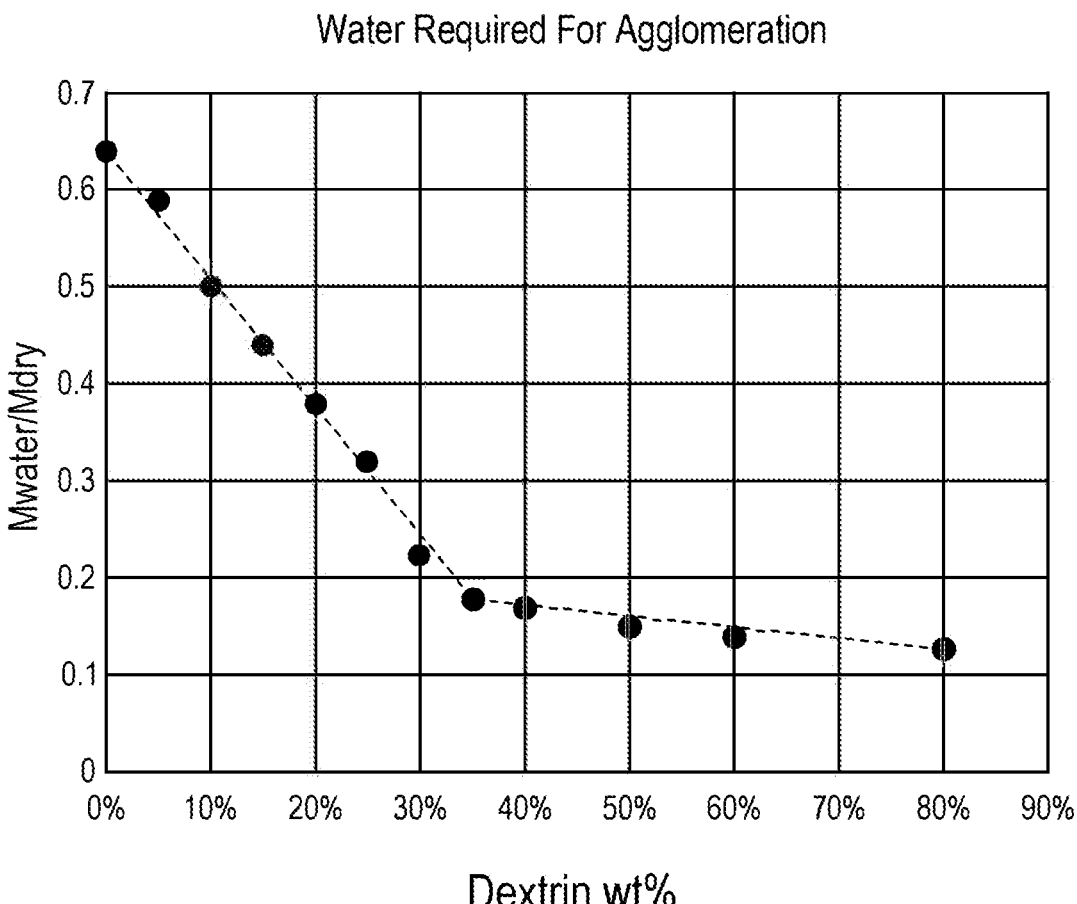
FIG. 6 shows the mass of water needed for agglomeration at various dextrin levels.

FIG. 6 shows the mass of water needed for agglomeration at various dextrin levels, to form composite litter particles as described herein. The results are plotted as the ratio of mass of water to mass of dry ingredients (e.g., starch and dextrin). As shown, the mass of water required for agglomeration is inversely proportional to the amount of dextrin, in a substantially linear relationship up to about 35% dextrin. At amounts greater than 35% dextrin, there is still an inverse relationship, although the slope of the relationship is greatly reduced. The values from FIG. 6 are recorded in Table 2 below.

TABLE 2

| Dextrin Wt. % | Starch Wt. % | Water % of Dry Components ($M_{water}/M_{dry}$) |
|---|---|---|
| 0% | 100% | 0.64 |
| 5% | 95% | 0.59 |
| 10% | 90% | 0.5 |

TABLE 2-continued

| Dextrin Wt. % | Starch Wt. % | Water % of Dry Components ($M_{water}/M_{dry}$) |
|---|---|---|
| 15% | 85% | 0.44 |
| 20% | 80% | 0.38 |
| 25% | 75% | 0.32 |
| 30% | 70% | 0.225 |
| 35% | 65% | 0.18 |
| 40% | 60% | 0.17 |
| 50% | 50% | 0.15 |
| 60% | 40% | 0.14 |
| 80% | 20% | 0.13 |

Comparative dusting, clump retention, absorptivity, and bulk density values for Example 2 as compared to the comparative commercial clay litter product comprising limestone and bentonite clay are shown below in Table 3.

TABLE 3

|  | Example 2 | Comp. Clay Litter |
|---|---|---|
| Dust | 2.5 mg | 25 mg |
| Clump Retention | 98.6% | 91.1% |
| Absorbency (g urine/g litter) | 0.59 | 0.39 |
| Bulk Density (lb/ft³) | 37.9 | 72 |

When 10% pine wood particles were dry mixed with the Example 2 composite particles, the bulk density was reduced to 34.5 lb/ft³.

Without departing from the spirit and scope of the invention, one of ordinary skill can make various changes and modifications to the invention to adapt it to various usages and conditions. As such, these changes and modifications are properly and intended to be, within the full range of equivalence of the following claims.

The invention claimed is:

1. An animal litter formed from renewable components, the animal litter comprising:
   composite particles including starch and dextrin agglomerated together into the composite particles, wherein the composite particles are formed by high shear mixing of the starch and the dextrin;
   wherein the dextrin comprises from about 20% to about 35% by weight of the composite particles and the starch comprises from about 50% to about 80% by weight of the composite particles;
   wherein the litter is substantially free of non-renewable mineral components;
   wherein the litter exhibits a clump retention of at least about 90%.

2. The litter of claim 1, wherein the starch comprises from about 70% to about 80% by weight of the composite particles.

3. The litter of claim 1, wherein the litter exhibits a clump strength that is greater than 800 $g_f$.

4. The litter of claim 1, wherein the litter exhibits a clump strength of at least about 1,000 $g_f$.

5. The litter of claim 1, wherein the litter exhibits a clump strength of from about 1,000 gr to about 10,000 $g_f$.

6. The litter of claim 1, wherein the litter exhibits an absorbency of at least about 0.45 g liquid/g litter.

7. The litter of claim 1, wherein the litter exhibits an absorbency of at least about 0.5 g liquid/g litter.

8. The litter of claim 1, wherein the litter exhibits an absorbency of from about 0.45 g liquid/g litter to about 1 g liquid/g litter.

9. The litter of claim 1, wherein the litter exhibits a bulk density of less than about 60 lb/ft³.

10. The litter of claim 1, wherein the litter exhibits a bulk density of less than about 50 lb/ft³.

11. The litter of claim 1, wherein the litter exhibits a bulk density of from about 30 to about 50 lb/ft³.

12. The litter of claim 1, wherein the composite particles further comprise powdered activated carbon.

13. The litter of claim 12, wherein the powdered activated carbon is present in an amount of from about 0.1% to about 5% by weight of the composite particles.

14. The litter of claim 12, wherein the powdered activated carbon is present in an amount of from about 0.25% to about 3% by weight of the composite particles.

15. The litter of claim 1, wherein the composite particles further comprise a preservative.

16. The litter of claim 15, wherein the preservative is present in an amount of up to 2% by weight of the composite particles.

17. The litter of claim 1, wherein the litter is void of a de-dusting agent.

18. The litter of claim 1, wherein the litter exhibits low dusting characteristics of no more than about 20 mg, no more than about 15 mg, no more than about 10 mg, or no more than about 5 mg as measured in a gravimetric dust measurement with an 850 cm³ litter sample, while being void of de-dusting agents.

19. The litter of claim 1, wherein the litter exhibits a clump weight of from about 15 g to about 40 g upon dosing with about 10 g of water or urine.

20. The litter of claim 1, wherein the litter further comprises wood.

21. The litter of claim 20, wherein the wood comprises at least one of wood powder or wood chips.

22. The litter of claim 1, wherein substantially all components of the litter are plant-based.

23. The litter of claim 1, where the composite particles of the litter further comprise an absorbent renewable core that is coated with the starch and dextrin agglomerated together, to form a coating over the absorbent renewable core of the composite particle.

24. The litter of claim 23, wherein the absorbent renewable core comprises at least one of wood, corn cob, corn, bran, grits, almond or walnut hulls, almond or walnut shells, straw, a grain, or another agricultural product particle.

25. The litter of claim 1, wherein the starch and dextrin are substantially homogenously distributed throughout the composite particles.

\* \* \* \* \*